United States Patent [19]

Jenkins

[11] 4,082,124
[45] Apr. 4, 1978

[54] HANDLING FLUENT MEDIA

[75] Inventor: David Henry Jenkins, Leamington Spa, England

[73] Assignee: The Eagle Engineering Company Limited, Warwick, England

[21] Appl. No.: 681,558

[22] Filed: Apr. 29, 1976

[30] Foreign Application Priority Data

May 2, 1975 United Kingdom ............... 18389/75

[51] Int. Cl.$^2$ ............................................. B65B 31/04
[52] U.S. Cl. ..................................... 141/65; 137/205; 141/231
[58] Field of Search .................... 417/340; 137/205; 141/65, 231, 114; 15/314; 222/95; 92/92

[56] References Cited

U.S. PATENT DOCUMENTS

| 406,718 | 7/1889 | Fish | 417/390 X |
|---|---|---|---|
| 862,867 | 8/1907 | Eggleston | 417/390 |
| 1,587,864 | 6/1926 | Sargent | 137/205 |
| 2,930,394 | 3/1960 | Bellows | 137/205 |
| 3,194,164 | 7/1965 | Fink et al. | 92/92 X |
| 3,866,474 | 2/1975 | Hasselmann | 141/114 X |
| 4,008,008 | 2/1977 | Vergnet | 92/92 X |

Primary Examiner—Irwin C. Cohen
Attorney, Agent, or Firm—Norris & Bateman

[57] ABSTRACT

Apparatus for handling fluent media such as an effluent tanker vehicle or mobile cesspit and gully emptier is provided with a rigid tank divided into two variable volume chambers by a flexible diaphragm enabling one chamber to be used for holding the media, giving a facility for emptying and filling to be effected by pressure transfer across the diaphragm on application of air pressure or vacuum in the other chamber. In this way only the one chamber need be contaminated by the fluent media, the other being kept clean for operating air or transport or clean water or other fluids, and substantially the whole volume of the vessel can serve as either chamber, of which the following is a specification.

3 Claims, 3 Drawing Figures

HANDLING FLUENT MEDIA

This invention relates to the handling of fluent media, which term is used to include fluids or fluid mixtures whether liquids (e.g. water) and/or gases (e.g.air), pulverulent or particulate materials whether fluidised or otherwise, and/or flowable mixtures or liquids and solids. The invention is particularly, but not exclusively, applicable to the handling of sewage, slurry, and similar effluent or waste products, and to vehicles for collection, transport and disposal thereof.

The object of the invention is to provide means for handling fluent media which is particularly simple and adaptable in use, and in which the above objections are substantially reduced or avoided.

According to one aspect of the invention there is provided apparatus for handling fluent media including a rigid vessel and operating means connected to the vessel in use for selectively pressurising and/or exhausting fluid therefrom characterised in that the vessel is divided by an impervious flexible diaphragm into an enclosed variable-volume propulsion chamber and an enclosed variable-volume holding chamber having an inlet for fluent media, whereby selective exhaustion or pressurisation of the holding chamber, whether directly by transfer of a propulsion fluid into or out of the holding chamber or by communication of changes in static pressure across the diaphragm due to transfer of propulsion fluid into or out of the propulsion chamber will draw fluent media into or expel fluent media from the holding chamber.

According to a second aspect of the invention there is provided apparatus for handling fluent media including a rigid vessel and operating means connected to the vessel in use for selectively causing a pressure differential therein characterised in that the vessel is divided by an impervious flexible diaphragm into an enclosed variable-volume propulsion chamber having a connection to the operating means and an enclosed variable-volume holding chamber having an opening for passage of fluent media, whereby selective application of a pressure differential within at least the propulsion chamber will pass fluent media through said opening of the holding chamber.

Preferred embodiments of the invention are now more particularly described with reference to the accompanying drawings wherein.

Figure 1:
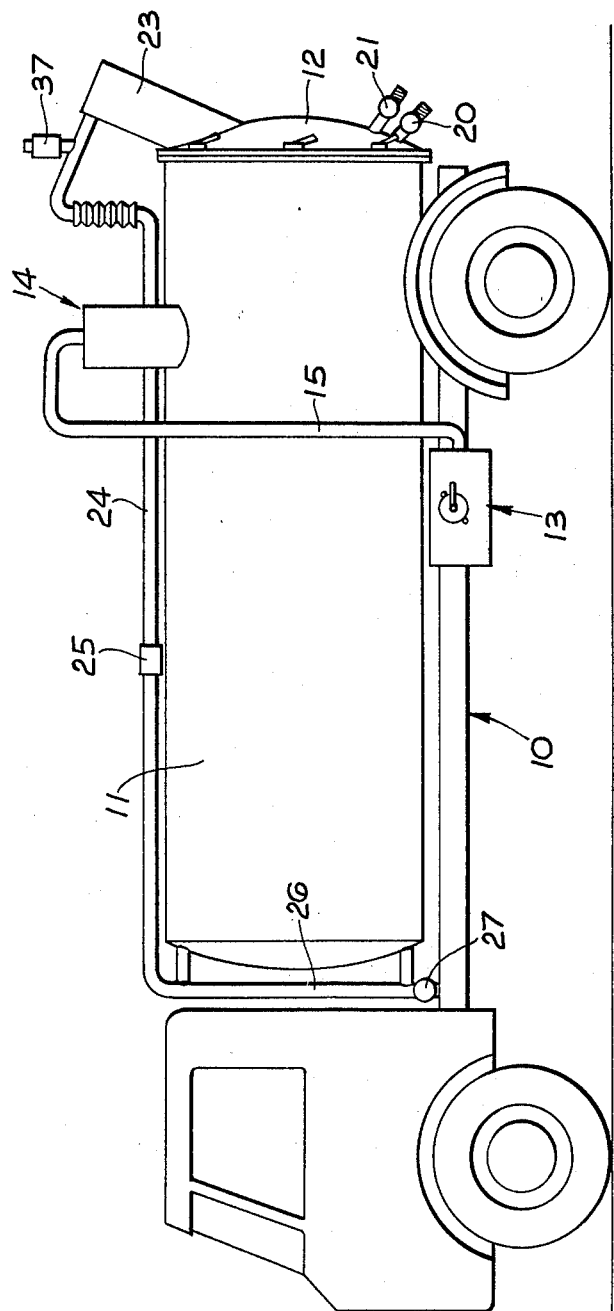
FIG. 1 is a side view of an effluent tanker vehicle.
Figure 2:
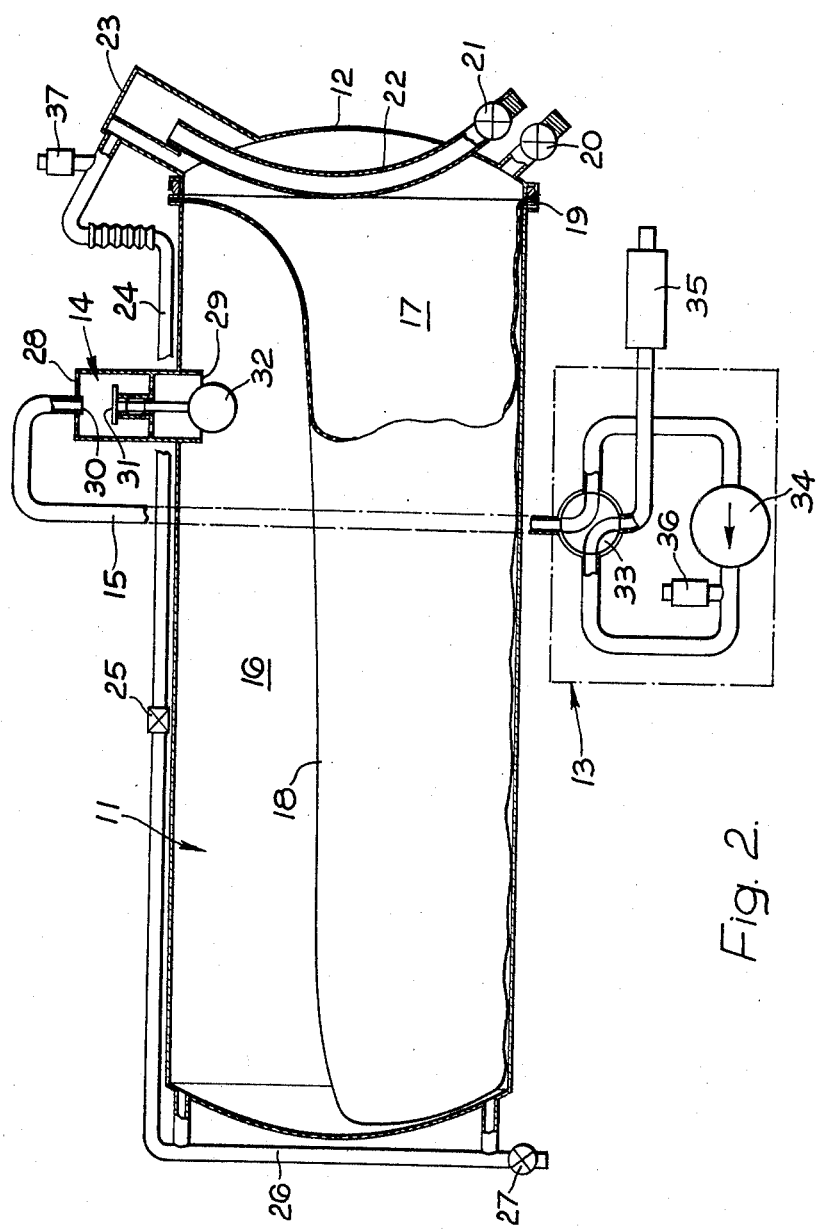
FIG. 2 is a diagrammatic longitudinal section of media handling apparatus of said vehicle.

The effluent tanker vehicle shown in FIGS. 1 and 2 comprises a chassis 10 on which is mounted a non-tipping rigid cylindrical steel vessel 11 with its axis horizontal. The rear end of vessel 11 is closed by a door 12, and an exhauster unit 13 (described in greater detail hereafter) selectively driven from the vehicle transmission is mounted below vessel 11 and connected by a duct 15 to a cut-off valve assembly 14 at the upper rear end of the vessel.

With reference to FIG. 2 the interior of vessel 11 is divided into a variable-volume propulsion chamber 16 and a variable-volume holding chamber 17 by a flexible diaphragm 18 formed of tough plastics or rubber reinforced with canvas or other material so as to be impervious and durable. Diaphragm 18 is bag-shaped and secured to a rear flange 19 of the vessel against which door 12 abuts. Thus holding chamber 17 is defined in part by door 12 at the rear end of vessel 11, and propulsion chamber 16 is defined in part by the front and side walls of vessel 11. Diaphragm 18 is dimensioned so that the maximum volume of either chamber 16 or 17 is substantially the entire volume of vessel 11.

The lower part of door 12 mounts a main discharge valve 20 in direct communication with chamber 17, and an inlet valve 21 at the lower end of a vertical duct 22 opening into an ullage chamber 23 which projects above the top of door 12. A connecting duct 24 interconnects the upper rear end of chamber 17 with the upper front end of chamber 16 by way of an interconnecting valve 25. The front end of duct 24 is also connected to a down pipe 26 opening into the lower front end of chamber 16 and terminating in an auxiliary discharge valve 27.

Cut-off valve assembly 14 comprises an enclosure 28 having a downwardly-directed rim 29 which projects slightly into chamber 16. A valve seat 30 in the top of enclosure 28 leads to the duct 15 and can be closed by a co-acting vertically guided plunger valve 31 whose lower end mounts a float 32 which can drop below rim 29.

Duct 15 leads by way of a flow-reversing changeover valve 33 in unit 13 to an exhauster pump 34 which, in turn, is connected to atmosphere through changeover valve 33 and a silencer 35. Pressure relief valves 36, 37 are provided respectively downstream of exhauster 34, and on duct 24 adjacent its connection with chamber 17.

To effect loading exhauster pump 34 is operated to draw air from chamber 16 through valve assembly 14 with discharge valves 20 and 27 closed and interconnecting valve 25 open, so drawing the effluent or othe fluent media through inlet valve 21 into holding chamber 17. During this operation any air present at the top of chamber 17 will be transferred through connecting duct 24 into propulsion chamber 16 for exhaustion. Thus there is no need to interrupt loading to purge air from chamber 17.

As loading progresses chamber 17 will expand to fill substantially the whole vessel 11 but the fluent media does not enter chamber 16, and cannot therefore pass into or through valve unit 14 or exhauster unit 13.

As the media level rises, within diaphragm 18, the upper face of the latter will eventually contact float 32 and urge it upwards so as to close plunger valve 31 and isolate the exhauster, so preventing overloading and any possibility of media being drawn along duct 24. Additionally, even if valve 31 should fail to operate, the diaphragm itself will eventually contact and press against rim 29 of housing 28 so as to isolate the exhauster unit and automatically terminate further loading.

As a further precaution against fluent media passing unnoticed into propulsion chamber 16 either along duct 24 or due to damage to diaphragm 18, a sight glass may be provided in downpipe 26.

If the load is liquid unloading can be effected by gravity on opening discharge valve 20. Discharge can be further assisted by changing over valve 33 and operating exhauster 34 to pressurise chamber 16, interconnecting valve 25 being closed, so as to drive the contents of chamber 17 out of the vessel. Loads having a substantial solid content can be cleared from the vessel by opening rear door 12 and pressurising chamber 16 causing diaphragm 18 to eject the load without the need for tipping of vessel 11.

To avoid accident a safety interlock may be provided to ensure that the chambers are not pressurised while door 12 is being opened.

The pressurised discharge referred to above enables viscous liquids and/or possibly dry granular or powder materials to be readily handled.

If the fluent media gives off harmful or noxious vapours loading will be effected with interconnecting valve 25 closed so that there is no communication between the two chambers. If chamber 16 is pressurised before loading commences to flatten diaphragm 18 and so minimise the volume of air in chamber 17 an almost full load can still be taken on.

A tanker as described above could be adapted for handling corrosive chemicals without the need for a corrosion resistant lining on the walls of vessel 11, as only the rear door or wall of the vessel need be of stainless steel or coated. Propulsion chamber 16 can be used for harmless fluids, e.g. clean water.

While use of separate inlet and discharge valves is preferred, the facility for pressurised discharge means that a single valve, possibly opening to the top of chamber 17, could be used for both functions.

Figure 3:
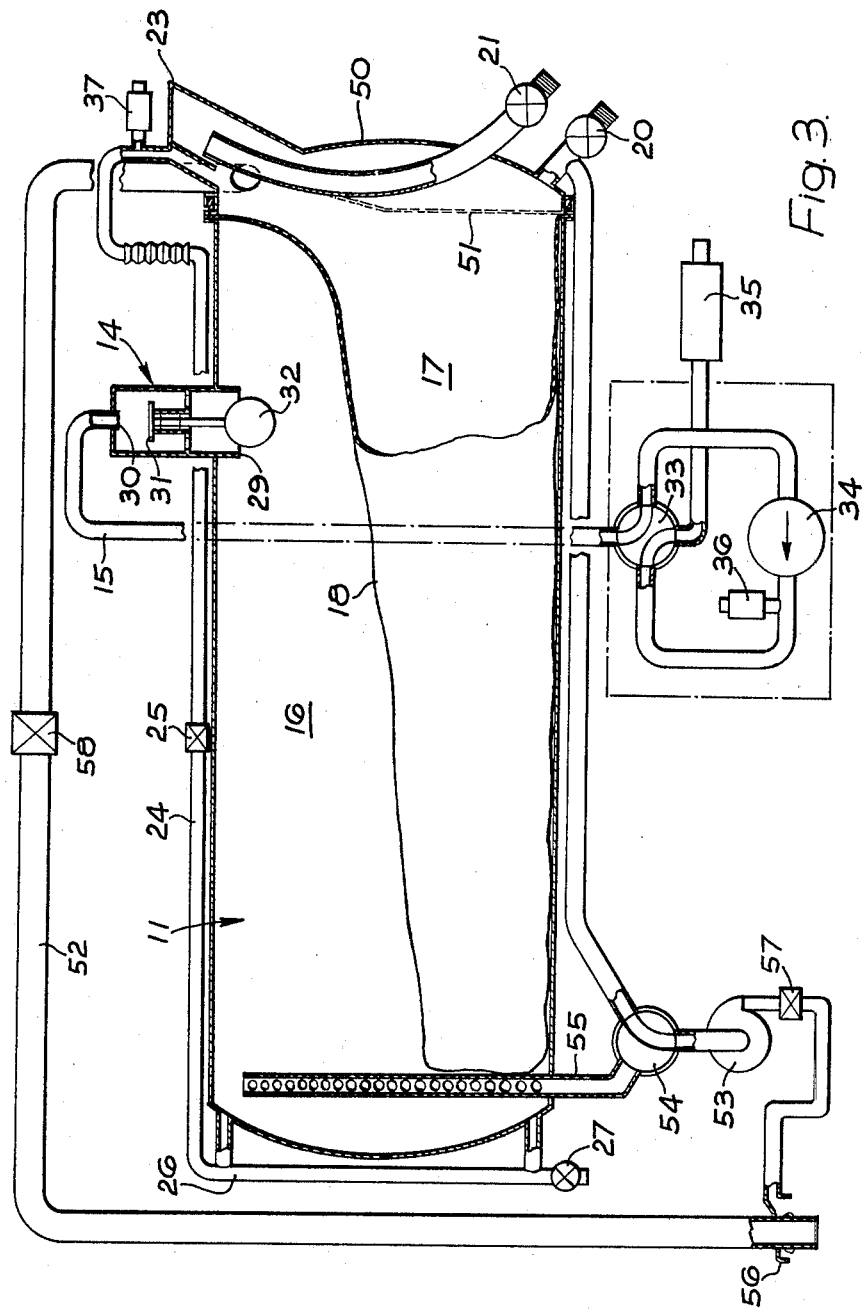
FIG. 3 is a like section of the apparatus of FIG. 2 modified to serve as a gully or cesspit emptier.

FIG. 3 shows the above apparatus modified for service as a gully or cesspit emptier. Components common to both constructions are given the same reference numbers and will not be described again. In this case chamber 11 is provided with a deeper door 50 which accommodates a removable sludge screen 51 between the major part of chamber 17 and discharge valve 20, and a hollow boom-like gully arm 52 is pivotally mounted on door 50 to communicate with said part of chamber 17.

A centrifugal water pump 53, driven from the vehicle transmission, is connected through a selector valve 54 to the inward side of discharge valve 20 so that water can be drawn from chamber 17 while sludge is retained by screen 51. Propulsion chamber 16 is used to hold a supply of clean water which can be selectively fed to pump 53 by way of feed duct 55 at the front end of vessel 11. Pump 53 is operable to feed pressurised water to an annular spray head 56 at the free end of arm 52 under the control of a water valve 57. A servo-operated gully valve 58 is provided in arm 52.

Before commencing operation the propulsion chamber 16 (i.e. substantially the whole volume of vessel 11) is filled with clean water. While working exhauster 34 is operated continuously with interconnecting valve 25 open to exhaust air from both chambers. Gully valve 58 is kept closed to maintain vacuum except when silt and water are actually being sucked from a gully. Water pump 53 feeds head 56 with dirty water drawn from chamber 17 to dislodge silt in the gully, at the same time as vacuum is applied through arm 58 so that operation is speedy and continuous. When the gully has been cleared gully valve 58 is closed and valve 54 is changed over to clean water supplied from chamber 16 which is used to flush the surrounding area and gully and reseal the latter. As work progresses the volume of clean water used from chamber 16 is replaced in vessel 11 by sludge and dirty water collected in chamber 17, giving extremely economical operation as compared with conventional gully emptiers as a much greater quantity of water can be carried on a smaller vehicle.

For discharge interconnecting valve 25 is closed, rear discharge valve 20 is opened and propulsion chamber 16 is pressurised to squeeze the sludge enclosed by diaphragm 18 against screen 51 to express water therefrom. The compressed sludge is then discharged by opening the door 50 and further pressurising of propulsion chamber 16, without the need to tip vessel 11, as previously described.

If the apparatus shown in FIG. 3 is to be used for cesspit emptying sludge screen 51 is removed and substantially the whole volume of vessel 11 is then available for sewage. The propulsion chamber 16 does not become contaminated and can be used subsequently for clean water. A vehicle fitted with this apparatus can readily be adapted for street washing by the addition of appropriate jets connected to pump 53, or emergency fire fighting, for these applications substantially the entire capacity of vessel 11 can be speedily filled with clean water drawn into propulsion chamber 16 to feed the pump, without the need to clean holding chamber 17.

While the invention has been described with reference to an effluent tanker vehicle or gully and cesspit emptying vehicle it is to be understood that it may also be embodied in stationary apparatus for storing or processing fluent media in vessels of almost any size or shape, and the flexible diaphragm may take various forms, for example it may be attached to a joint on a median plane of the vessel, or may be a bag or sac having a neck or mouth attached to an inlet/outlet duct if liquids only are to be handled and an opening door to the holding chamber is unnecessary. The propulsion chamber can be pressurised and exhausted using gases other then air; or possibly a liquid which might be drained from said chamber by gravity to create a vacuum in the holding chamber for filling, and returned to the propulsion chamber when the holding chamber is to be emptied.

Instead of a pressure differential within the propulsion chamber being applied both to draw fluent media into the holding chamber and expel said media therefrom, the holding chamber may be filled by other means, e.g. by direct pumping of the fluent media, with discharge effected by pressurisation of at least the propulsion chamber.

It is also contemplated that, for some operations, a propulsion fluid (normally air) could be transferred into or out of the holding chamber itself to pressurise or exhaust the latter to load or unload it with fluent media instead of or as well as the indirect pressurisation or exhaustion of the holding chamber by communication of changes in static pressure across the diaphragm due to transfer of propulsion fluid into or out of the propulsion chamber as by pressurising or exhausting air from the latter in the manner described with reference to the above embodiments.

Having now described my invention what I claim is:

1. A tanker vehicle for collection, transport and disposal of fluent media comprising a rigid vessel mounted on a vehicle chassis, one end wall of said vessel being formed as an openable door; a bag-shaped impervious flexible diaphragm mounted within the vessel to divide it into respective enclosed variable volume propulsion and holding chambers, the holding chamber being bounded in part by said door, the maximum volume of either chamber being substantially the total volume of the vessel, and the two chambers changing in volume during operation in inverse relationship; an inlet duct and a discharge duct for fluent media mounted on said vessel and opening respectively into upper and lower regions of the holding chamber; an exhauster pump mounted on the vehicle and connected to be driven from a power source of the vehicle, means whereby said pump is selectively operable through a flow-reversing changeover valve connected to the propulsion chamber on the one hand to draw air from said propulsion chamber so as to diminish its volume and lower the pressure in the holding chamber for drawing fluent media into said holding chamber through the inlet duct, and to on the other hand pressurize the propulsion chamber so as to increase its volume and expel contents of the holding chambers through said discharge duct; a purging duct linking said upper region and the propulsion chamber through an interconnecting valve permitting selective transfer of air from the holding chamber as fluent media is being drawn into said holding chamber; and cut-off valve operating automatically to isolate said exhauster pump from the propulsion chamber when the volume of the holding chamber reaches a predetermined maximum.

2. A vehicle according to claim 1 wherein the vessel is a non-tipping cylindrical tank having said door at its rear end, said diaphragm being secured to a rear flange against which the door abuts and said inlet, discharge, and purging ducts being mounted on said door.

3. A vehicle according to claim 1 wherein the cut-off valve includes a vertically guided plunger valve member mounted in the top of the propulsion chamber for contact by an upper face of the diaphragm when the holding chamber volume reaches said maximum.

* * * * *